UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

SOLVENT FOR ACETYL CELLULOSE AND PROCESS.

1,229,487.   Specification of Letters Patent.   Patented June 12, 1917.

No Drawing. Original application filed May 23, 1912, Serial No. 699,234. Divided and this application filed June 6, 1916. Serial No. 102,000½.

*To all whom it may concern:*

Be it known that I, WILLIAM G. LINDSAY, a citizen of the United States, residing at Caldwell, in the county of Essex and State of New Jersey, have invented certain new and useful Improvements in Solvents for Acetyl Cellulose and Processes, of which the following is a specification.

The various compositions to which the present invention relates are employed in the arts, sometimes as imitations of natural substances, and sometimes as films which are used for photographic purposes, whether as the base upon which the sensitive coating is superimposed or as a component part of the film with which the sensitized substance has been partially incorporated in the sensitization. Although the final or useful form of the different compounds of acetyl cellulose is that of a solid or dry material, the different processes of conversion into this final solid form involve, as is well understood, the employment of solutions or mixtures of varying consistencies as to elasticity, stiffness or fluidity, depending generally upon the proportion or kind of solvent used to the amount of the original base—acetyl cellulose.

In the treatment of acetyl cellulose for the production of solutions for the manufacture of lacquers, varnishes, photographic films, and flexible or plastic compounds, I have discovered that chloroform in admixture with ethyl or methyl alcohol produces a compound solvent for acetyl cellulose of the variety which is freely soluble in acetone, possessing valuable properties in the manufacture of films or plastic masses, and that such solvents may be used with either the acetone-soluble variety or acetyl cellulose or the so-called triacetate of cellulose.

The following examples will instruct the operator as to the methods of employing these new solvents:—

To 100 parts of acetyl cellulose (so-called triacetate of cellulose) I add from 30 to 40 parts either of paraethyltoluolsulfonamid, ethyl acetanilid, tetrachlorethyl acetanilid, methyl acetanilid, or camphor, and then put into the mixture 100 parts of chloroform in admixture with 10 to 20 parts of either ethyl or methyl alcohol. The mixture is then stirred or otherwise kneaded, and after a uniform mixture has been obtained the volatile solvent is allowed to evaporate to the extent of about 70 parts during the stirring or mixing operation. The dough-like mass thus obtained is then rolled or worked up in the manner of manufacturing nitrocellulose-camphor compounds.

Again, to 100 parts of acetyl cellulose of the acetone-soluble variety described I add 30 to 50 parts of paraethyltoluolsulfonamid, or one of the other solid substances named,— (ethyl acetanilid, tetrachlorethyl acetanilid, methyl acetanilid, camphor), and then add 50 to 70 parts of chloroform mixed with an equal volume of methyl or ethyl alcohol. After a thorough incorporation and kneading, the excess of solvent is allowed to evaporate in the further manipulation, and the resultant dough-like product is further worked up in the well-known manner for making nitro-cellulose-camphor compounds.

Still again, as another example, for the manufacture of thin transparent sheets I take 100 parts of the acetyl cellulose which is freely soluble in acetone and add, say 15 to 20 parts of triphenylphosphate and 600 parts of a mixture of 60 parts, by volume, of chloroform and 40 parts, by volume, of methyl alcohol. The mixture is then carefully stirred until a uniform solution is obtained. This solution is then allowed to settle, and upon spreading upon a smooth polished surface such as glass and allowing the excess of solvent to evaporate a thin transparent sheet is obtained.

This is a division from my application Serial No. 699,234 filed May 23, 1912.

The term "aryl acetamids" comprises such substances for the purposes of my invention as ethyl acetanilid, tetrachlorethyl acetanilid, methyl acetanilid, etc., said tetrachlorethyl acetanilid being a chlorinated alkyl aryl acetamid.

Having thus described my invention, what I claim is:—

1. The composition of matter which comprises acetyl cellulose, an aryl acetamid, chloroform, and a monohydric alcohol having not more than two carbon atoms.

2. The composition of matter which comprises acetyl cellulose, an alkyl aryl acetamid, chloroform, and a monohydric alcohol having not more than two carbon atoms.

3. The composition of matter which comprises a mixture of about 100 parts of acetyl cellulose, about 30 to 40 parts of an aryl acetamid, about 100 parts of chloroform containing about 10 to 20 parts of a monohydric alcohol having not more than two carbon atoms.

4. The composition of matter which comprises acetyl cellulose, a chlorinated alkyl aryl acetamid, chloroform, and a monohydric alcohol having not more than two carbon atoms.

5. The composition of matter which comprises acetyl cellulose, tetrachlorethyl acetanilid, chloroform, and a monohydric alcohol having not more than two carbon atoms.

In testimony whereof, I have signed my name to this specification in the presence of two subscribing witnesses, this 31" day of May 1916.

WILLIAM G. LINDSAY.